(12) United States Patent
Velasquez

(10) Patent No.: US 10,158,435 B2
(45) Date of Patent: Dec. 18, 2018

(54) SYSTEMS AND METHODS FOR DETECTING PASSIVE INTERMODULATION SOURCES USING THERMAL IMAGING

(71) Applicant: CommScope Technologies LLC, Hickory, NC (US)

(72) Inventor: Edward Velasquez, Dallas, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/753,396

(22) PCT Filed: Sep. 13, 2016

(86) PCT No.: PCT/US2016/051432
§ 371 (c)(1),
(2) Date: Feb. 19, 2018

(87) PCT Pub. No.: WO2017/048669
PCT Pub. Date: Mar. 23, 2017

(65) Prior Publication Data
US 2018/0241485 A1    Aug. 23, 2018

Related U.S. Application Data

(60) Provisional application No. 62/219,812, filed on Sep. 17, 2015.

(51) Int. Cl.
| | | |
|---|---|---|
| *H04B 1/10* | (2006.01) | |
| *H04L 1/20* | (2006.01) | |
| *H04B 17/14* | (2015.01) | |
| *H04B 17/19* | (2015.01) | |

(52) U.S. Cl.
CPC ........... *H04B 17/19* (2015.01); *H04B 1/1027* (2013.01); *H04B 17/14* (2015.01); *H04L 1/20* (2013.01)

(58) Field of Classification Search
CPC ...... H04B 17/19; H04B 17/14; H04B 1/1027; H04L 1/20
See application file for complete search history.

(56) References Cited

U.S. PATENT DOCUMENTS

| | | |
|---|---|---|
| 2009/0239475 A1 | 9/2009 | Lehman |
| 2013/0054169 A1 | 2/2013 | Neidhardt et al. |
| 2013/0310023 A1 | 11/2013 | Bevan |
| 2014/0119197 A1 | 5/2014 | Maca et al. |
| 2014/0146866 A1 | 5/2014 | Strachan et al. |
| 2015/0145528 A1 | 5/2015 | Yeo et al. |

(Continued)

FOREIGN PATENT DOCUMENTS

WO    WO 2014/012585    1/2014

OTHER PUBLICATIONS

International Search Report and Written Opinion of the International Searching Authority, International Application No. PCT/US2016/051432, dated Dec. 20, 2016.

(Continued)

*Primary Examiner* — Nguyen T Vo
(74) *Attorney, Agent, or Firm* — Myers Bigel, P.A.

(57) ABSTRACT

Aspects of the present disclosure are directed to systems and methods for detecting a passive intermodulation (PIM) source in a radio frequency (RF) device through analysis of a thermal image of the RF device.

20 Claims, 7 Drawing Sheets

(56) References Cited

U.S. PATENT DOCUMENTS

2015/0350940 A1* 12/2015 Wilson .................. H04W 24/08
370/252
2017/0324485 A1   11/2017 Patel et al.

OTHER PUBLICATIONS

Keysight Technologies: "Keysight Technologies TrueIR series Thermal Imager—Brochure", Retrieved from the Internet <URL:http://literature.cdn.keysight.com/litweb/pdf/5992-0902EN.pdf?id=2630838>, Jul. 21, 2015, 9 pp.

Keysight Technologies: "Innovative Passive Intermodulation (PIM) and S-parameter Measurement Solution with the ENA", Retrieved from the Internet <URL:http://literature.cdn.keysight.com/litweb/pdf/5991-0332EN.pdf?id=2185173>, Dec. 5, 2014, 20 pp.

* cited by examiner

SYSTEMS AND METHODS FOR DETECTING PASSIVE INTERMODULATION SOURCES USING THERMAL IMAGING

CROSS-REFERENCE TO RELATED APPLICATION APPLICATIONS

This application is a 35 U.S.C. § 371 national stage application of PCT Application No. PCT/US2016/051432, filed on Sep. 13, 2016, which itself claims priority to U.S. Provisional Patent Application Ser. No. 62/219,812, filed Sep. 17, 2015, the entire contents of both of which are incorporated herein by reference in their entireties. The above-referenced PCT Application was published in the English language as International Publication No. WO 2017/048669 A1 on Mar. 23, 2017.

BACKGROUND

Passive intermodulation (PIM) distortion can directly affect the performance of an RF communications system. PIM distortion occurs when a PIM source in a radio frequency (RF) system generates PIM that can interfere with desired RF signals that are transmitted through the RF communication system. RF connections, metal fatigue, breaks, cold solder joints, intermittent metal contacts, loose metal shavings and corrosion are common examples of PIM sources. To optimize performance of components used in RF communications systems such as phase shifters, diplexers, antennas and the like, careful quality inspection of the hardware and PIM testing is often performed during, for example, manufacturing to identify PIM sources so that corrective action can be taken to remove these PIM sources. Unfortunately, in some cases, accurate identification of PIM sources can be difficult with conventional PIM detection techniques, and can be tedious to perform.

SUMMARY

Various aspects of the present disclosure may be directed to systems and methods for detecting a PIM source in a first RF device through analysis of a thermal image of the RF device. In some embodiments, a thermal image of the first RF device may be captured that contains heat signatures of one or more portions of the first RF device. The heat signatures of the captured thermal image may then be compared to one or more reference thermal signatures of, for example, a second RF device of the same type as the first RF device, where the second RF device was known to have an acceptable level of PIM. Based on the comparison, a source of PIM of the first RF device may be determined. In other embodiments, heat signatures within a captured image of an RF device may be compared to each other and stored data and differences in those heat signatures may be used to identify potential PIM sources in the RF device.

BRIEF DESCRIPTION OF THE DRAWINGS

The following detailed description of the disclosure will be better understood when read in conjunction with the appended drawings, which illustrate example embodiments. It will be understood that the present invention is not limited to the particular embodiments disclosed herein, or to the precise arrangements and instrumentalities shown. In the drawings.

DETAILED DESCRIPTION

Figure 1:
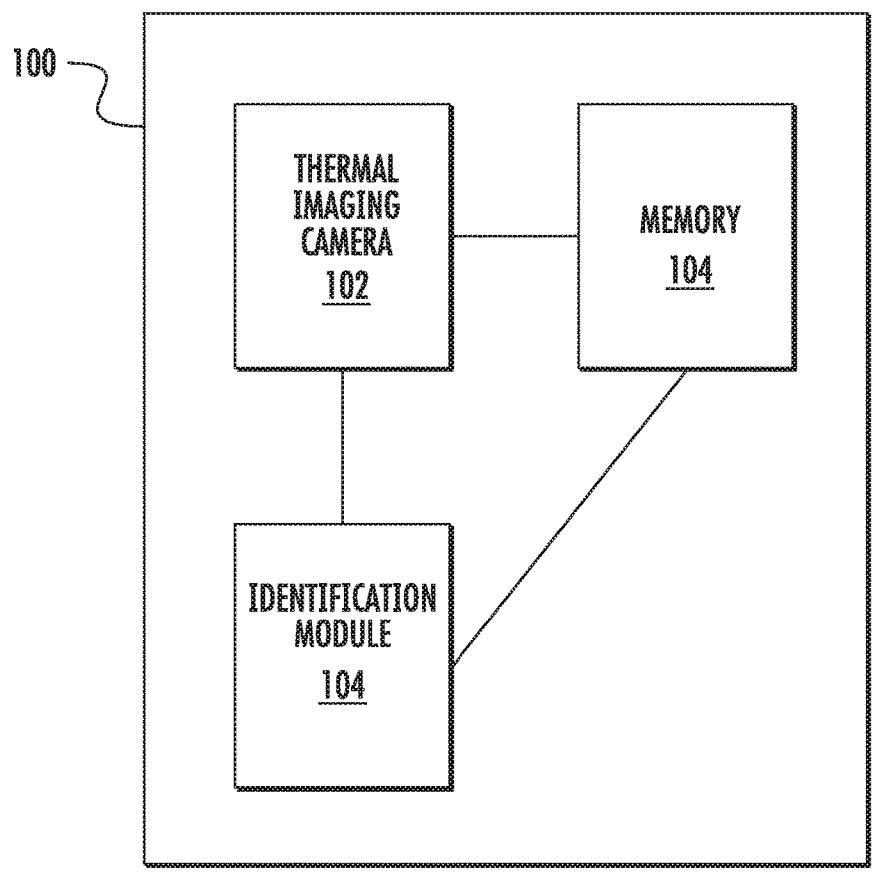
FIG. 1 is a block diagram of a system for PIM source detection according to an aspect of the present disclosure.

Certain terminology is used in the following description for convenience only and is not limiting. The words "lower," "bottom," "upper," "top" and similar terms designate directions in the drawings to which reference is made. It will be appreciated, that the device may be turned over or rotated and that then these designations would change accordingly. Unless specifically set forth herein, the terms "a," "an" and "the" are not limited to one element, but instead should be read as meaning "at least one."

Aspects of the present disclosure are directed to systems and methods for detecting a source of PIM in an RF device through analysis of a thermal image of the RF device. Such systems and methods may take advantage of the fact that, when RF signals travel through an RF device, such as an antenna, phase shifter, diplexer or the like, a pattern of infrared energy, otherwise known as a heat signature, is created. Any object that alters, or disturbs, this path of RF signals, may create a different heat signature. Such an object may be a source of PIM, which may affect the performance of the RF device. A first RF device that includes a PIM source may have a different heat signature than would a second RF device of the same type that did not include the PIM source. Consequently, PIM sources may be identified through the use of a high resolution thermal imaging camera. Such techniques may be advantageous during inspection of an RF device, as the identified PIM source may be removed or otherwise remedied before the RF device is sold and/or installed in the field.

FIG. 1 is a block diagram of a system 100 for detecting PIM sources in an RF device in accordance with an aspect of the present disclosure. It should be appreciated by those of ordinary skill in the art that the various components and the functions shown in FIG. 1, which will hereinafter be described in greater detail, are merely one illustration of an embodiment of the present disclosure. Thus, it should be understood that other components may be substituted for any of the components shown in FIG. 1 and that components that perform other functions may alternatively be employed. In other words, the present disclosure is not limited to the precise structure and operation of the components shown in FIG. 1 as will hereafter be described.

Referring to FIG. 1, the PIM source detection system 100 may include various components, including but not limited to: a thermal imaging camera 102, a memory 104, and an identification module 106. The thermal imaging camera 102 may be configured to capture a thermal image of an RF device, for example, under test, and one or more areas surrounding the RF device. The thermal imaging camera 102 may be any of a number of known, commercially available high resolution cameras, such as for example, a TIM 450 thermal imaging camera, manufactured by Micro-Epsilon of Raleigh, N.C. While not shown in FIG. 1, the RF device under test may be connected to PIM test apparatus that is used to inject one or more RF test signals into the RF device under test. The thermal imaging camera 102 may capture the thermal image while the RF device under test has the RF test signals input thereto.

The memory 104 may be configured to store thermal image information, such as heat signatures of various RF devices and surrounding areas of the same, threshold energy levels, and the like. For example, the stored heat signature may be of a specific geographic area, or zone, of an RF device. In some embodiments, the stored heat signatures may take the form of reference heat signatures classified as being PIM free, or as having an acceptably low level of PIM, such that the PIM levels of the RF device are sufficiently low so as to not affect the performance of the RF device. The memory 104 may alternatively or additionally include information regarding relative differences in the temperatures, energy levels or the like for different portions of a thermal image of an RF device under test. For example, for a specific RF device under test such as, for example, an RF phase shifter, it may be known that the RF transmission lines on the phase shifter should be no more than "x" degrees hotter than other portions of the phase shifter. The memory 104 may include information regarding acceptable temperature differences between various portions of such a phase shifter for a relatively PIM-free device. The memory 104 may be realized as RAM memory, flash memory, EPROM memory, EEPROM memory, registers, a hard disk, a removable disk, or any other form of storage medium known in the art.

The identification module 106 may be configured to determine and/or locate any source of PIM in the captured image. For example, the identification module 106 may compare the heat signature in a first portion of a captured image to another heat signature in the captured image to check for comparatively large differences. Based on the size of each identified difference (e.g., larger than a threshold delta value of infrared energy), the identification module 106 may determine that the location of the relatively large difference may be a source of PIM. As a result, the identification module 106 may be configured to issue an alarm, alerting a user to the determination, and potentially, the location of the PIM source. Alternatively, the identification module 106 may compare one or more heat signatures in the captured thermal image of the RF device to one or more reference heat signatures (e.g., of a similar area of an RF device similar to that of the RF device currently under test) that are stored, for example, in the memory 104. If the difference between a captured heat signature and a reference heat signature is too large (e.g., above a threshold energy level), the identification module 106 may be configured to issue an alarm, alerting a user to the determination, and potentially, the location of the PIM source. Human identification may also be used as an alternative or in conjunction with the operation of the identification module 106.

Figure 2:
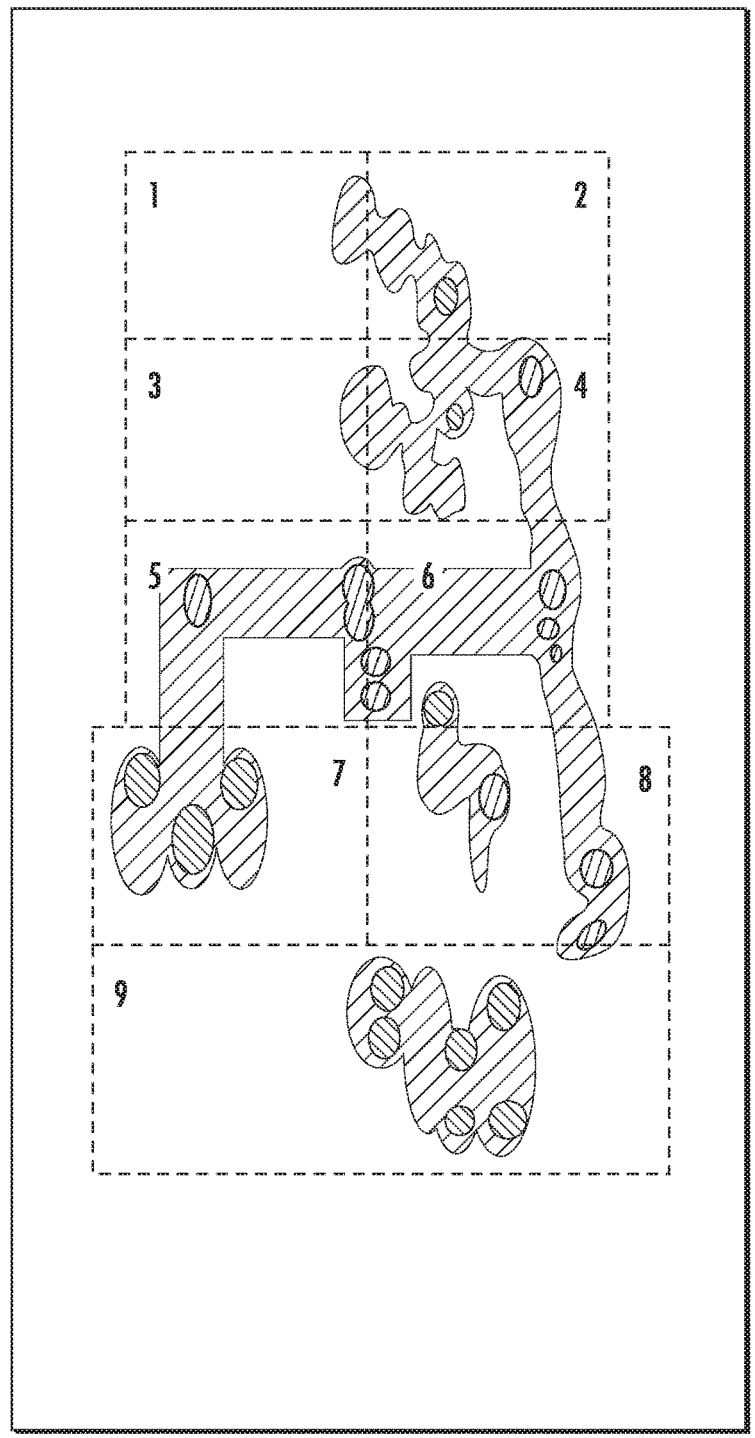
FIG. 2 is a line drawing of a captured thermal image of an RF device.
Figure 3:
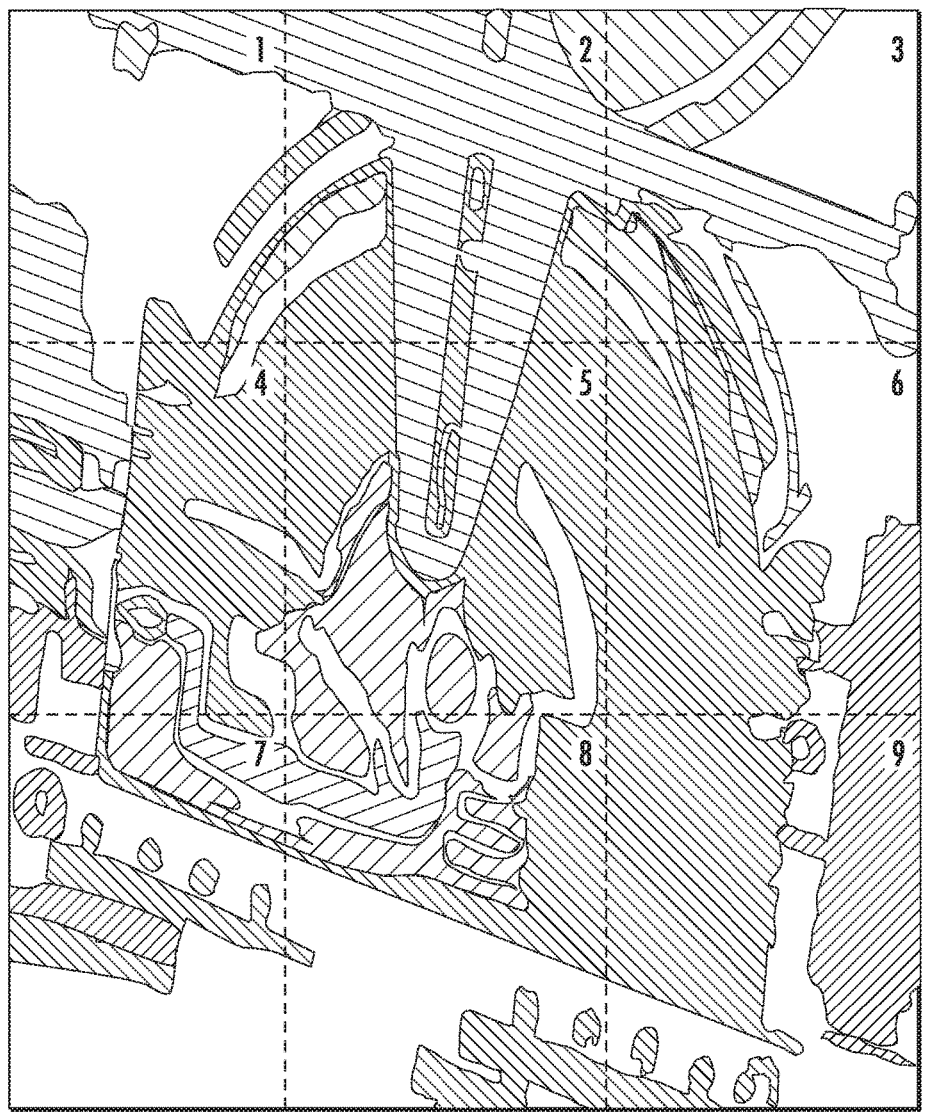
FIG. 3 is another line drawing of a captured thermal image of an RF device.

In order to improve the accuracy by which the thermal imaging camera 102 may detect potential PIM sources, the thermal imaging camera 102 may be configured to divide the overall area of the thermal image to be captured into geographical areas or "zones". FIGS. 2 and 3 are schematic line drawings of example thermal images 200, 300 captured by the thermal imaging camera 102. In the examples of FIGS. 2 and 3, each RF device is a phase shifter for a base station antenna. The captured thermal images may be in any appropriate form. For example, in some embodiments, the captured images may be grayscale images. In other embodiments, the captured thermal images may be color images. In still other embodiments, the captured thermal images may merely comprise data files of temperature information, thermal energy levels or the like that can be used by the identification module 106 without any need to represent the data graphically. As FIGS. 2 and 3 are line drawings of grayscale or color thermal images, areas having different temperature levels are illustrated via different types of cross-hatching in FIGS. 2 and 3.

Figure 5A:
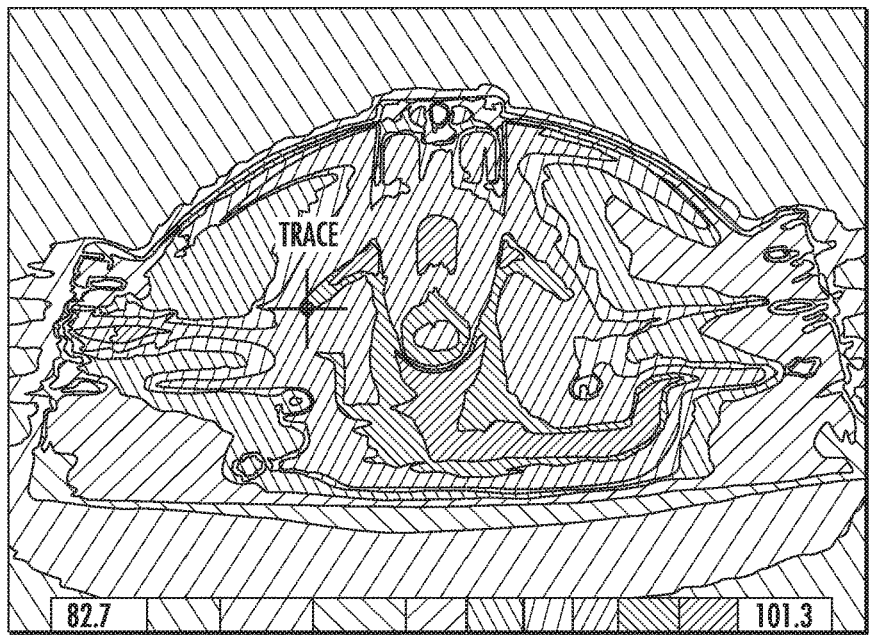
FIG. 5A is a schematic line drawing of a thermal image of a phase shifter that includes a PIM source in the form of a stress crack in the back plate.
Figure 5B:
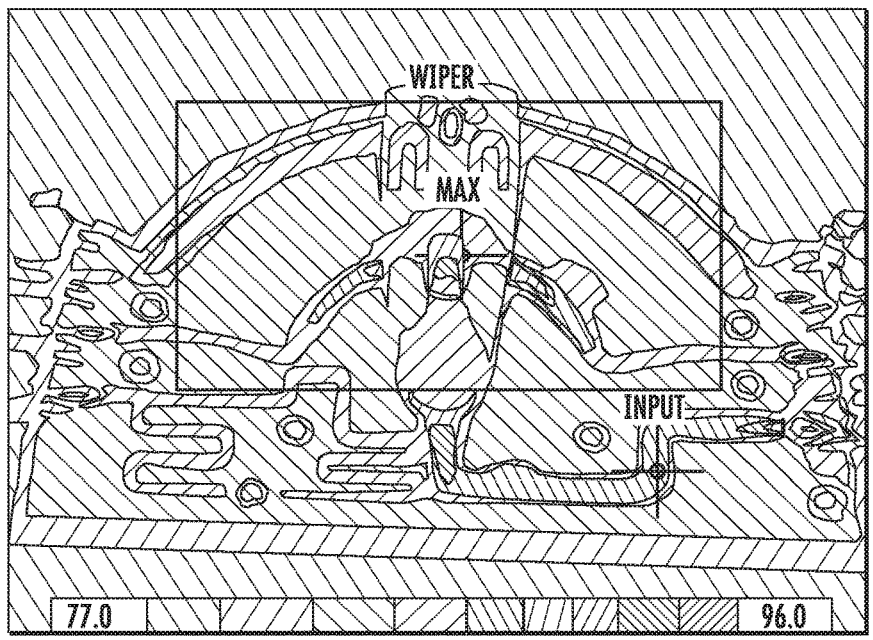
FIG. 5B is a schematic line drawing of a thermal image of a phase shifter that includes a PIM source in the form of a defective wiper arm.

FIGS. 5A and 5B are schematic line drawings of thermal images taken of RF devices that exhibited poor PIM performance. A temperature scale is provided at the bottom of each of FIGS. 5A and 5B that relates the different types of cross-hatching included in these figures to different temperature levels. FIG. 5A is a schematic line drawing of a thermal image of a phase shifter that includes a PIM source in the form of a stress crack in the back plate. As can be seen in FIG. 5A, high temperature variations are observed throughout the entire middle of the device in the vicinity of the crack. FIG. 5B is a schematic line drawing of a thermal image of a phase shifter that includes a PIM source in the form of a defective wiper arm. In this case, the high temperature variations are observed only at two selected locations on the wiper arm.

Based on the RF device to be tested, or the one or more zones of the thermal image to be captured, the thermal imaging camera 102 may be configured, or otherwise adjusted, to provide an appropriate resolution for the analysis to be performed. For example, as shown in FIGS. 2 and 3, in example embodiments each of the thermal images 200, 300 are divided into nine zones, that are delineated by dashed lines in FIGS. 2 and 3. Although nine zones are shown, it should be noted that thermal images may be divided into any number of zones, and the zones may have desired shape. The zones may also have different sizes. As shown by the arrow in the thermal image 300 in FIG. 3, a large variation in emitted infrared energy is present in zone 3. This large variation may be identified, as discussed above, by comparing the heat signature of zone 3 to a reference heat signature for zone 3 and/or by comparing the heat signature for zone 3 to the heat signatures for one or more other zones in the captured thermal image of FIG. 3. The large variation shown in the example of FIG. 3 is due to a crack in an aluminum bracket of the phase shifter that acts as an inconsistent metal-to-metal connection that generates PIM. Although the examples in FIGS. 2 and 3 are thermal images of phase shifters, thermal images of any RF device, or component thereof, may be captured and analyzed for PIM detection according to aspects of the present disclosure. For example, aspects of the present disclosure may be applied to power dividers, diplexers, radiating elements, and other components of an antenna, or to the antenna as a whole.

A thermal window or thermal focus may indicate the resolution of a range of temperatures visible in the captured thermal image. Each zone of the captured thermal image may exhibit smaller or larger variations among heat signatures. Consequently, one resolution setting may be sufficient for one thermal window of one zone. However, this same resolution setting may not be sufficient, or sensitive enough for detection, of a PIM source in another thermal window of a different zone. As such, through adjustment, for example, of the span or temperature range of the image to be captured, or individual zones within the image to be captured, the accuracy of PIM source detection may be improved.

Figure 4:
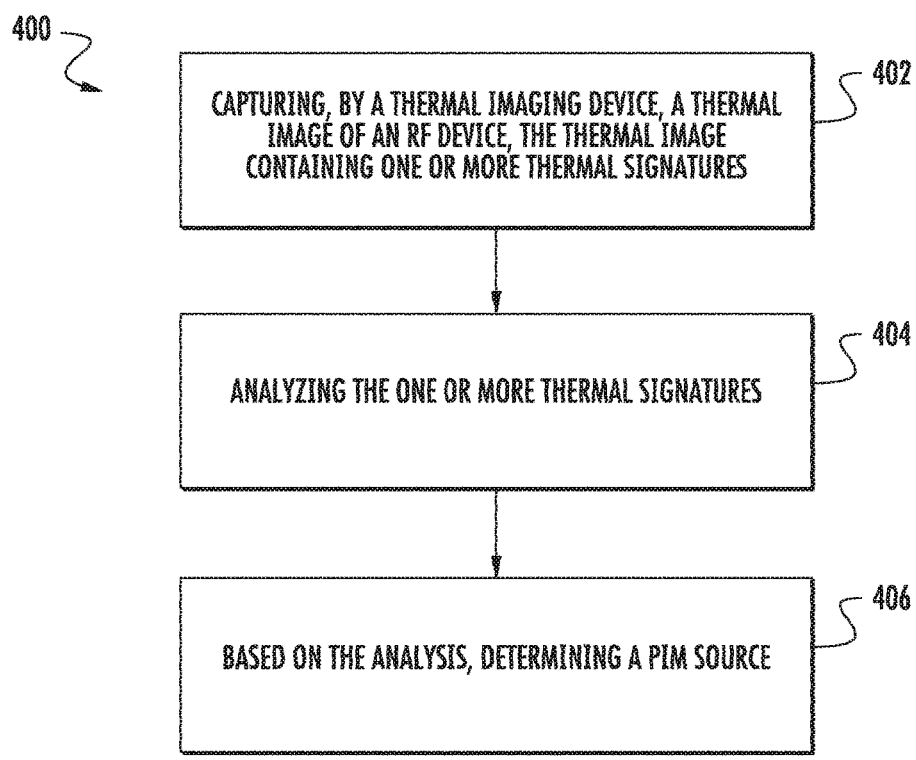
FIG. 4 is a flow chart illustrating a method for detecting a PIM source in an RF device under test according to an aspect of the present disclosure.

FIG. 4 is a flow chart illustrating a method 400 for detecting a source of PIM of an RF device through analysis of a thermal image of the RF device. The method may include capturing, by a thermal imaging device, a thermal image containing one or more thermal signatures of the RF device while one or more RF signals are passed through the RF device (Block 402). The captured thermal image may be divided into a plurality of zones. The heat signatures of the captured thermal image may be analyzed for thermal variations (Block 404). This analysis may include a comparison of different heat signatures within the captured thermal image, or comparison of one or more heat signatures in the captured thermal image to one or more reference heat signatures. Based on the analysis, a PIM source may be identified by the location of the detected heat signature variation (Block 406).

The background temperature level may affect the above-described comparisons between a heat signature in a captured thermal image and a reference heat signature. For example, if the reference heat signature was taken from a thermal image that was captured when the room temperature was at a first level and the heat signature for the RF device under test was captured when the room temperature was at a second level that is different than the first level, then this difference in background room temperature may increase the level of variations between the heat signature of the RF device under test and the reference heat signature. The identification module may identify and take into account such differences in the background temperature to improve the accuracy of the PIM source identification. For example, as noted above, in some cases the captured thermal image may include areas surrounding the device under test. The heat signatures for these surrounding areas may be used to calibrate the comparison between the heat signature of an RF device under test and a reference heat signature. For example, a difference (e.g., in temperature, thermal energy level, etc.) between the heat signature of a background area in a captured thermal image of an RF device under test and the heat signature of the same background area in a reference captured thermal image that includes reference heat signatures may be used to adjust the comparisons between the heat signatures to account for this background temperature difference. In other embodiments, the background temperature for each captured thermal image (including reference thermal images) may be recorded and this background temperature information may be used to perform a calibration. Other techniques may also be used. Such calibration may improve the accuracy of the PIM source detection.

Some RF devices such as, for example, a base station antenna, may include a large amount of metal on the top side of the RF device. It may be difficult to obtain good thermal images for such devices due to the large amount of metal. Accordingly, pursuant to further embodiments of the present invention, a sheet of RF absorbing material may be placed over part or all of the RF device under test and the thermal image may be taken of the RF device under test with the sheet of RF absorbing material thereon. The RF absorbing material absorbs the RF energy emitted from portions of the RF device under test thereunder, and hence heat signatures on the thermal image of the sheet of RF absorbing material may be compared to, for example, a reference heat signature taken of a reference RF device under test with a sheet of RF absorbing material thereon.

Figure 6A:
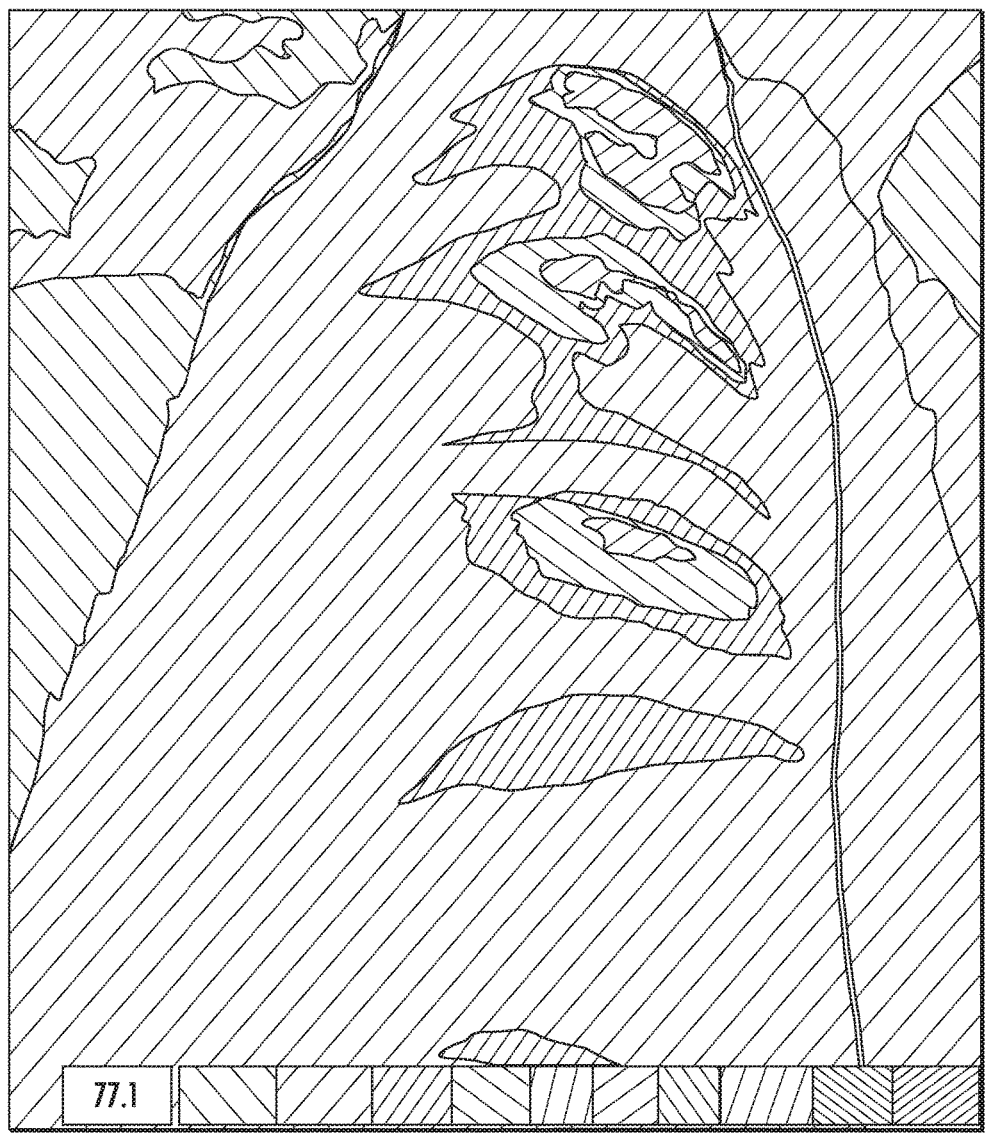
FIG. 6A is a schematic line drawing of a thermal image of an antenna with an RF absorbing material placed thereon that does not include any significant PIM sources.
Figure 6B:
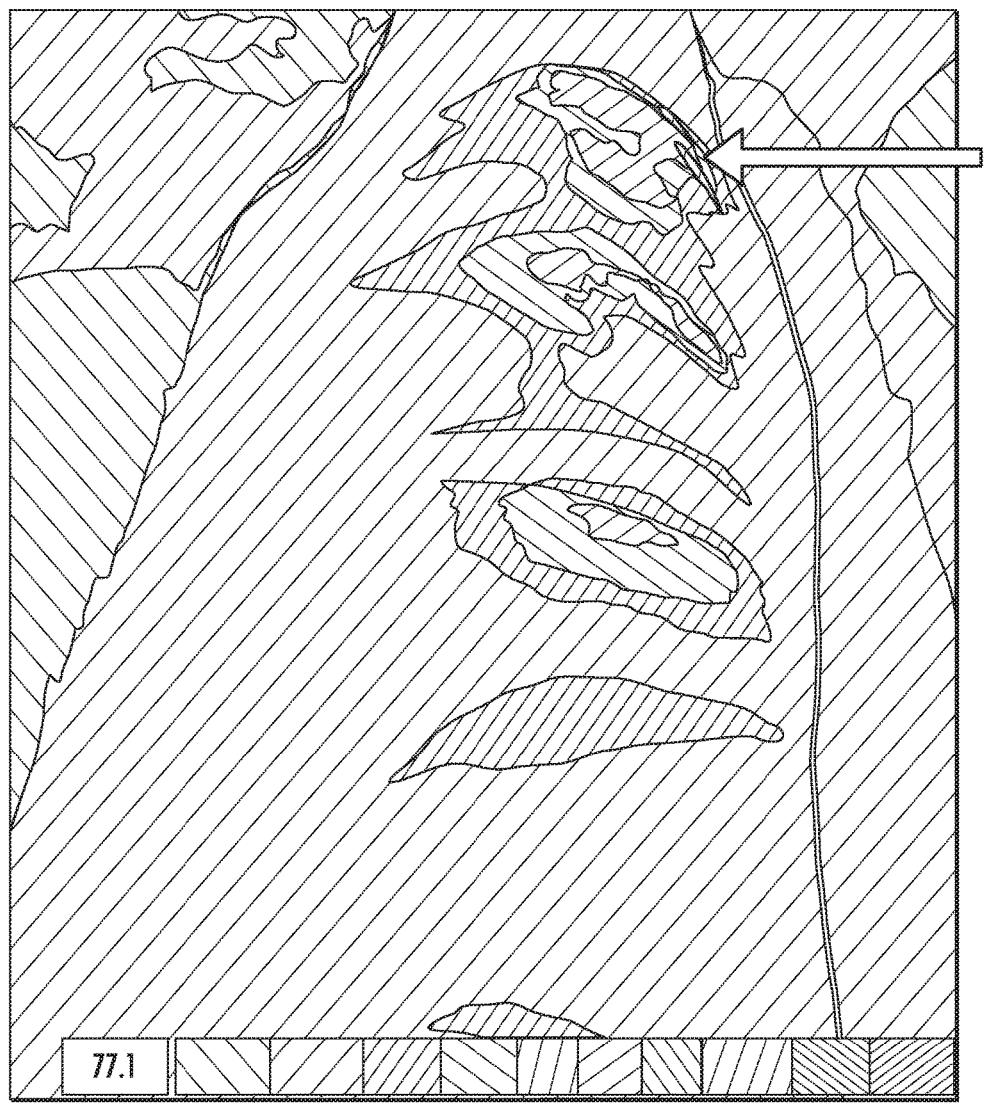
FIG. 6B is a schematic line drawing of a thermal image of another unit of the antenna of FIG. 6A with an RF absorbing material placed thereon, where the antenna includes a PIM source.

The use of such an RF absorbing material is illustrated in FIGS. 6A and 6B. In particular, FIG. 6A is a schematic line drawing of a thermal image taken of a base station antenna that has a sheet of RF absorbing foam material placed thereon. A temperature scale is provided at the bottom of each of FIGS. 6A and 6B that relates the different types of cross-hatching included in these figures to different temperature levels. The thermal image of FIG. 6A was taken while RF PIM test signals were transmitted through the antenna as part of a PIM test. In FIG. 6A, the base station antenna under test did does not include any significant PIM sources. The thermal image of FIG. 6A therefore does not show any unusual variations. FIG. 6B is a schematic line drawing of a thermal image taken during a PIM test of another unit of the same antenna illustrated in FIG. 6A, again with an RF absorbing material placed thereon. In FIG. 6B, the antenna includes a PIM source at the location of the arrow, as evidenced by the increased temperature differential.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative components, modules (e.g., the identification module 106), and associated functionality described in connection with the embodiments disclosed herein may be implemented as electronic hardware, computer software, or combinations of both. Skilled artisans may implement the described functionality in varying ways for each particular application, but such implementation decisions should not be interpreted as causing a departure from the scope of the present disclosure.

The various functionality described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various embodiments of the disclosure have now been discussed in detail; however, the disclosure should not be understood as being limited to these embodiments. It should also be appreciated that various modifications, adaptations, and alternative embodiments thereof may be made within the scope and spirit of the present disclosure.

That which is claimed is:

1. A method of identifying a passive intermodulation (PIM) source in a radio frequency (RF) device, the method comprising:
   inputting one or more RF signals to the RF device;
   using a thermal imaging device to capture a thermal image of at least a portion of the RF device while the one or more RF signals are input to the RF device;

identifying the PIM source based at least in part on a first heat signature included in the captured thermal image.

2. The method of claim 1, wherein identifying the PIM source based at least in part on a first heat signature included in the captured thermal image comprises comparing the first heat signature included in the captured thermal image to a second heat signature.

3. The method of claim 2, wherein the second heat signature comprises a reference heat signature that is associated with a second RF device of the same type as the first RF device, the second RF device having been identified as having PIM levels below a predetermined threshold.

4. The method of claim 3, the method further comprising adjusting for a temperature difference between a background temperature associated with the first heat signature and a background temperature associated with the second heat signature when comparing the first heat signature in the captured thermal image to the second heat signature.

5. The method of claim 2, wherein the second heat signature is also included in the captured thermal image.

6. The method of claim 5, the method further comprising dividing the captured thermal image into geographical zones, wherein the first and second heat signatures are associated with different ones of the geographical zones.

7. The method of claim 1, further comprising placing an RF absorbent material on the RF device, and wherein using a thermal imaging device to capture a thermal image of at least a portion of the RF device comprises capturing a thermal image of the RF absorbent material.

8. The method of claim 1, the method further comprising dividing the captured thermal image into a plurality of geographical zones.

9. A method of detecting a source of passive intermodulation (PIM) in a radio frequency (RF) device under test, the method comprising:
    capturing, by a thermal imaging device, a thermal image of the RF device while one or more RF signals are input to the RF device, the thermal image including one or more heat signatures;
    comparing at least one of the heat signatures to one or more reference heat signatures; and
    based on the comparison, determining a source of PIM of the RF device under test.

10. The method of claim 9, wherein the one or more reference heat signatures are associated with a second RF device that has been identified as having PIM levels below a predetermined threshold.

11. The method of claim 9, the method further comprising adjusting for a temperature difference between the background temperature associated with the one or more heat signatures and a background temperature associated with the one or more reference heat signatures.

12. The method of claim 9, further comprising placing an RF absorbent material on the RF device under test, and wherein capturing, by the thermal imaging device, the thermal image of the RF device while the one or more RF signals are input to the RF device, comprises capturing a thermal image of the RF absorbent material that corresponds to the thermal image of the RF device under test while the one or more RF signals are input to the RF device.

13. The method of claim 9, the method further comprising dividing the thermal image into a plurality of geographical zones.

14. A method of identifying a passive intermodulation (PIM) source in a radio frequency (RF) device, the method comprising:
    inputting one or more RF signals to the RF device;
    using a thermal imaging device to capture a thermal image of at least a portion of the RF device while the one or more RF signals are input to the RF device;
    identifying the PIM source based at least in part by comparing a first heat signature included in the captured thermal image to a second heat signature.

15. The method of claim 14, wherein the second heat signature comprises a reference heat signature that is associated with a second RF device that has been identified as having PIM levels below a predetermined threshold.

16. The method of claim 14, the method further comprising adjusting for a temperature difference between a background temperature associated with the first heat signature and a background temperature associated with the second heat signature.

17. The method of claim 14, wherein the second heat signature is also included in the captured thermal image.

18. The method of claim 17, the method further comprising dividing the captured thermal image into a plurality of geographical zones, wherein the first and second heat signatures are associated with different ones of the geographical zones.

19. The method of claim 14, further comprising placing an RF absorbent material on the RF device, and wherein using a thermal imaging device to capture a thermal image of at least a portion of the RF device while the one or more RF signals are input to the RF device comprises capturing a thermal image of the RF absorbent material while the one or more RF signals are input to the RF device.

20. The method of claim 14, wherein the captured thermal image also includes a background area behind the RF device, the method further comprising determining a temperature of the background area.

\* \* \* \* \*